United States Patent
Spychalski et al.

(10) Patent No.: US 9,281,146 B2
(45) Date of Patent: Mar. 8, 2016

(54) HYDROPHONE SIGNAL LIMITING SHUNT SWITCH

(75) Inventors: Brian Stephen Spychalski, Gulfport, MS (US); Scott Arthur Erickson, Gulfport, MS (US)

(73) Assignee: High Tech, Inc., Long Beach, MS (US)

( * ) Notice: Subject to any disclaimer, the term of this patent is extended or adjusted under 35 U.S.C. 154(b) by 926 days.

(21) Appl. No.: 13/507,410

(22) Filed: Jun. 26, 2012

(65) Prior Publication Data

US 2013/0343162 A1    Dec. 26, 2013

(51) Int. Cl.
*H01H 35/24* (2006.01)
*G05B 1/04* (2006.01)

(52) U.S. Cl.
CPC . *H01H 35/24* (2013.01); *G05B 1/04* (2013.01)

(58) Field of Classification Search
CPC ....... H01H 35/24; G01V 1/164; G01V 1/186; G05B 1/04
USPC ...................... 200/86 R; 307/144; 367/4, 178
See application file for complete search history.

(56) References Cited

U.S. PATENT DOCUMENTS

| | | | |
|---|---|---|---|
| 3,239,624 A * | 3/1966 | Clason | 200/81.9 R |
| 4,022,146 A | 5/1977 | Sadler | |
| 4,041,865 A | 8/1977 | Evans | |
| 4,050,382 A | 9/1977 | Power | |
| 4,495,849 A | 1/1985 | Cooke | |
| 4,721,486 A | 1/1988 | Goettel | |
| 4,922,067 A | 5/1990 | West | |
| 4,931,601 A | 6/1990 | Lavender | |
| 5,237,136 A * | 8/1993 | Langston | 200/81 R |
| 5,834,641 A | 11/1998 | Sternal | |

* cited by examiner

*Primary Examiner* — Krystine Breier
(74) *Attorney, Agent, or Firm* — Stanford Patents LLC; George E. Stanford

(57) ABSTRACT

The present invention concerns a hydrophone signal limiting shunt switch, electrically associated and physically conjoined with a conventional hydrophone, for limiting hydrophone signal operability to water depths less than a predetermined, proscribed depth. The primary components of the shunt switch are a protected plunging bolt, at least one disk spring and an electrically conducting foot, none of which are ever in direct contact with the ocean environment. Flexure of the disk spring is the sole determinant of switch actuation. Upon sensing a predetermined, proscribed operating depth, the protected plunging bolt forces the electrically conducting foot to shunt the electrical connection between the associated hydrophone and the hydrophone transmission cable, consequently, quenching the hydrophone signal at the proscribed depth.

15 Claims, 9 Drawing Sheets

HYDROPHONE SIGNAL LIMITING SHUNT SWITCH

BACKGROUND

1. Field of the Invention

The present invention concerns generally a hydrostatic actuated electrical circuit limit device. In particular, the present invention is directed to a tamper-proof acoustic hydrophone electrical signal limiting shunt switch; the shunt switch apparatus situated within the body or housing of and connectively conjoined with an associated hydrophone, imperatively quenching and preventing any signal transmission from the associated hydrophone when the hydrostatic pressure of the surrounding environment of the hydrophone exceeds a predetermined value, thereby rendering the hydrophone inoperative at or below a predetermined depth.

2. Description of the Related Art

There are many instances when it is desired to control the operation and functioning of an apparatus by means of a pressure sensor, such instances typically involving mechanical pressure, air pressure, or hydrostatic pressure. More particularly, in a maritime or aquatic environment, hydrostatic pressure sensors are often used, for example, ignition of a depth charge or the opening of a conduit to a sample bottle to obtain a sample of seawater at a desired depth. Typically, such devices are "single event" devices and do not employ electrical circuitry, that is, once the initial event has occurred the device either explodes or there is no need for a subsequent sampling event.

However, there are also numerous instances where hydrostatic switches are employed in conjunction with an electrical circuit. Such switches can be broadly categorized into fluid flow control or operating safety.

Hydrostatic flow control switches can be found in water purification and supply systems. For example, U.S. Pat. No. 4,922,067 "Fluid Pressure Switch Having Venting Means For Dispersing Back Pressure" by H. L. West utilizes deformation of laminated conducting and nonconducting materials to detect changes in water pressure. In similar manner, U.S. Pat. No. 4,931,601 by W. J. Lavender also uses a combination of insulating and conducting materials to sense changes in water pressure. Such devices are generally designated for use on land.

Safety at sea and on the water is always a prime concern of those who are in any way involved in a maritime environment. Consequently, many devices used on or under the sea incorporate an ancillary safety device for protection. Such pressure sensors often control an electrical circuit, turning the apparatus either on or off, initiating, igniting, or preventing a potentially dangerous function from occurring.

For example, U.S. Pat. No. 4,495,849 "Remotely Activated Cable Cutter" by M. W. Cooke et al. includes an electrically connected pressure switch "designed to inactivate the apparatus beyond a preset ocean depth". A detailed description of the switch is absent; presumably, it is a conventional switch proper. Another example of a hydrostatic pressure switch incorporated in an apparatus intended for use under water is U.S. Pat. No. 4,050,382 "Electrically Detonated Explosive Device" by J. M. Power. In both cases, the hydrostatic actuated electrical limit switch is ancillary to the predominant purpose of the apparatus, that is, either severing an underwater cable or igniting an explosive device. These aforementioned inventions are incorporated herein by reference for purposes of indicating the background of the present invention or illustrating the mature state of the art.

In marked contrast to the aforementioned patents, the purpose of the present invention is not ancillary, but a major fail-safe, tamper-proof component of a hydrophone, incorporated therein to nondestructively limit the operating depth of that hydrophone to a predetermined depth.

SUMMARY

An objective of the present invention is to provide a readily adjustable acoustic hydrophone electrical signal limit switch which nondestructively limits the operation of an associated hydrophone to depths more shallow than a predetermined depth setting. Another objective of the present invention is to provide a tamper-proof acoustic hydrophone electrical signal limit switch which can be readily incorporated with existing commercially available hydrophones. A further objective of the present invention is to provide an acoustic hydrophone electrical signal limit switch which allows the resumption of the normal hydrophone function once the hydrophone is removed upwards above the preset depth limit. Yet another objective of the present invention is to provide an acoustic hydrophone electrical signal limit switch which is not directly exposed to the ocean environment. Yet a further objective of the present invention is to provide an acoustic hydrophone electrical signal limit fail-safe, tamper-proof switch which is environmentally robust and reliably functions at ocean depths up to and in excess of 1000 m.

Successively viewed upwards from Glass-ceramic Shunt Switch End Piece 27 are components: Foot 18, Compression Spring 16, O-Ring B 17, Base 26, Disk Springs 25, Shim Washer 15, Retaining Ring 24, freely-moving Protected Plunging Bolt 22, Shroud 23, O-Ring A 14, and Silicone Rubber Boot 13. The Silicone Rubber Boot 13 provides for an Oil Filled Cavity 21 to communicate external environment hydrostatic pressure to the head of Plunging Bolt 22.

Figure 4:
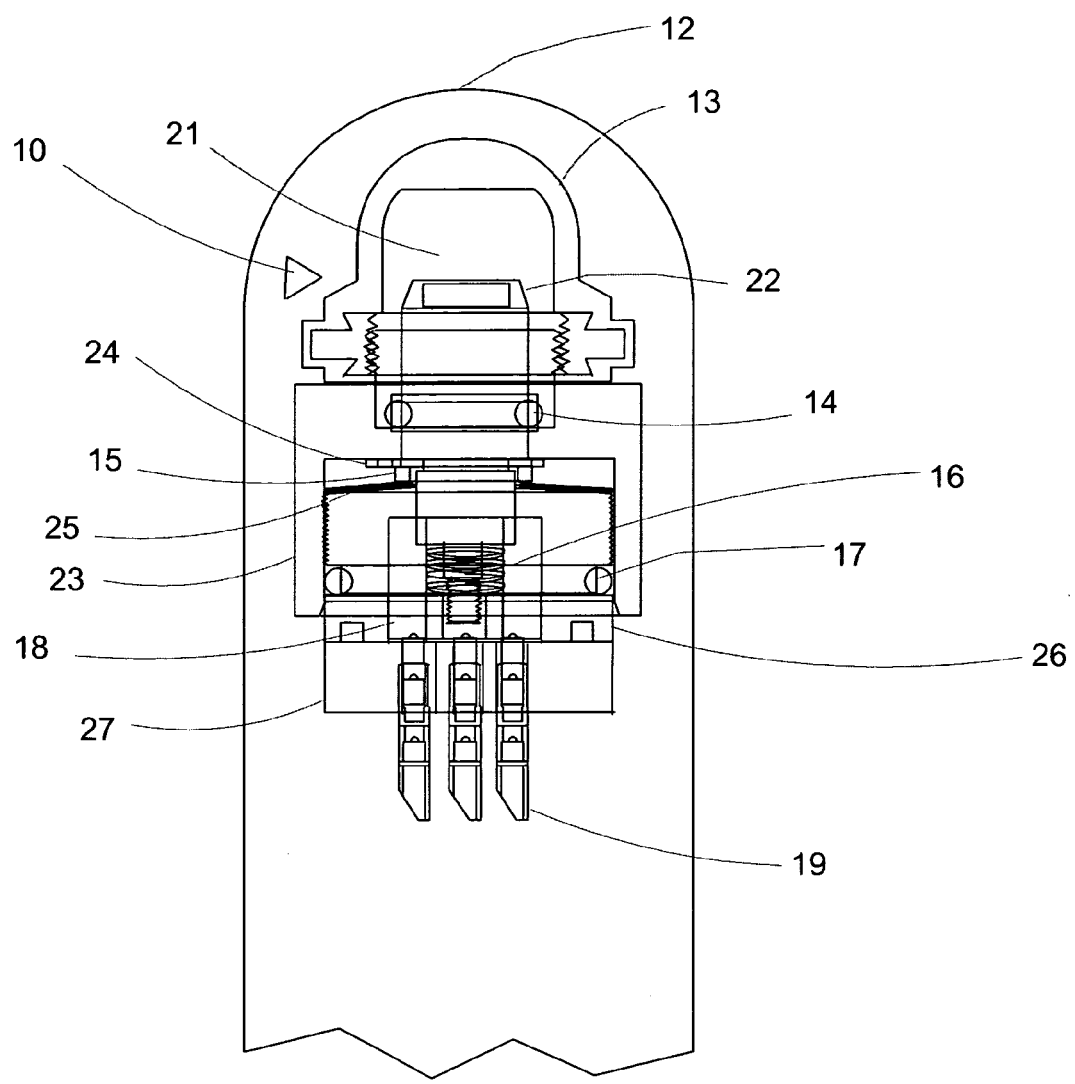

FIG. 4 is an elevation half-section view of an assembled preferred embodiment of Signal Limiting Shunt Switch 10 positioned within Polyurethane Shunt Switch and Hydrophone Encapsulation 12 (the associated hydrophone is not shown in this illustration).

Figure 5:
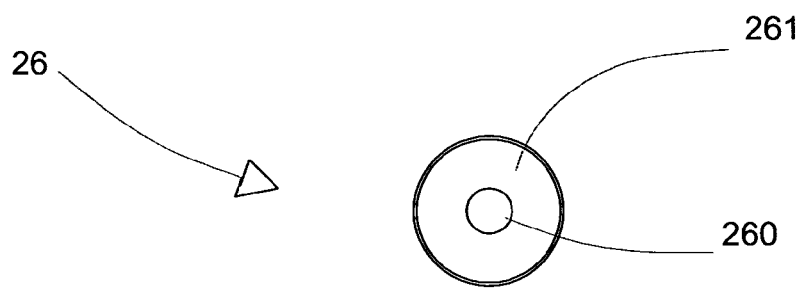

FIG. 5 illustrates a top view of Base 26. This view shows a Base Bore 260 and a Base Upper Surface 261.

Figure 6:
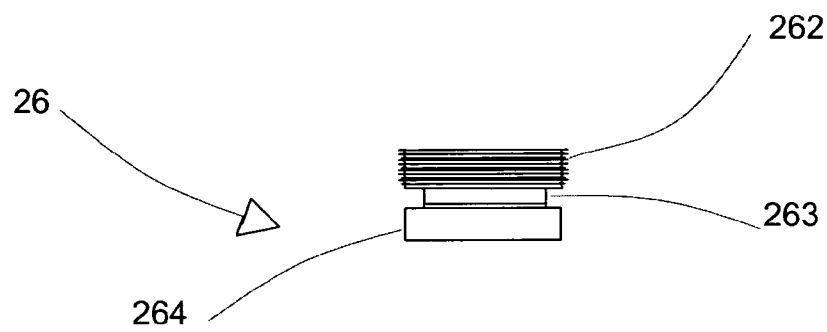

FIG. 6 illustrates an elevation center view of Base 26. This view shows a Base Threaded Collar 262, a Base O-ring Groove 263, and a Base Lower Collar 264.

Figure 7:
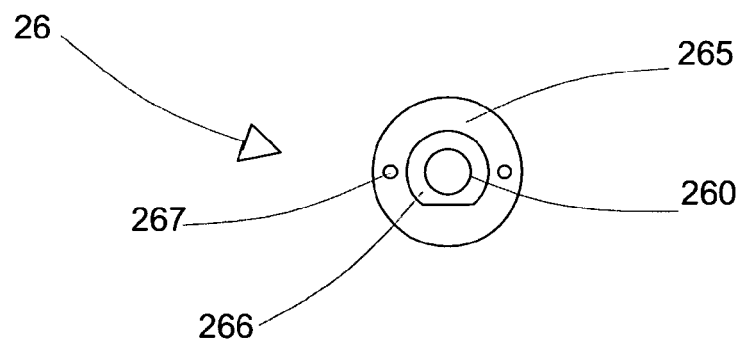

FIG. 7 illustrates a bottom view of Base 26, displaying a Base Bore 260, a Base Lower Collar Face 265, a Base Foot Well 266, and Base Fixture Holes 267. Base 26 is an important component of the present invention, interacting with Foot 18, via the "D"-shaped key way, Disk Springs 25, O-Ring B 17, Plunging Bolt 22, and Shroud 23.

Figure 8:
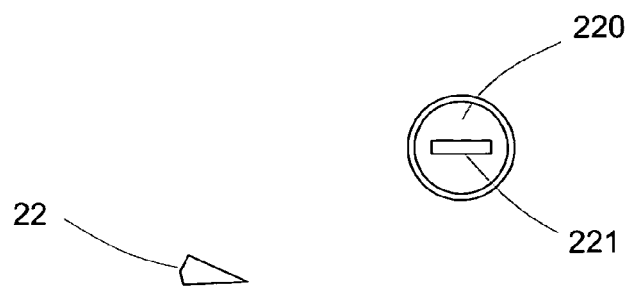

FIG. 8 illustrates a top view of Plunging Bolt 22. Plunging Bolt 22 is a machined shaft whose upper end is Bolt Head 220, featuring a Bolt Adjustment Tool Aperture 221.

Figure 9:
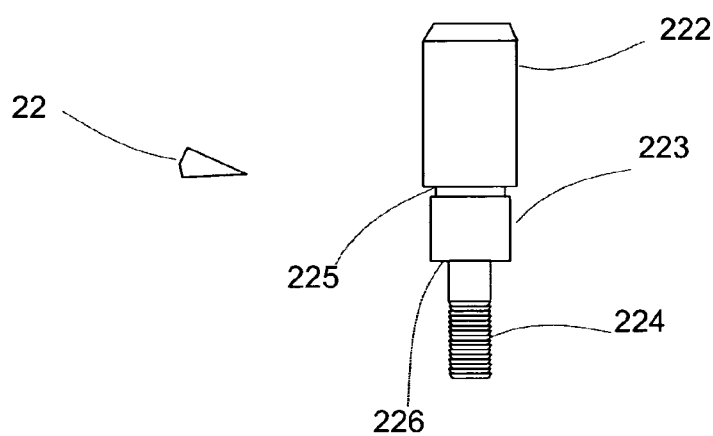

FIG. 9 illustrates a side, center view of Plunging Bolt 22, displaying a Primary Bolt Shaft Section 222, a Secondary Bolt Shaft Section 223, a Threaded Bolt Shaft Section 224, Bolt Snap-Ring Groove 225, and Circumferential Shoulder 226.

Figure 10:
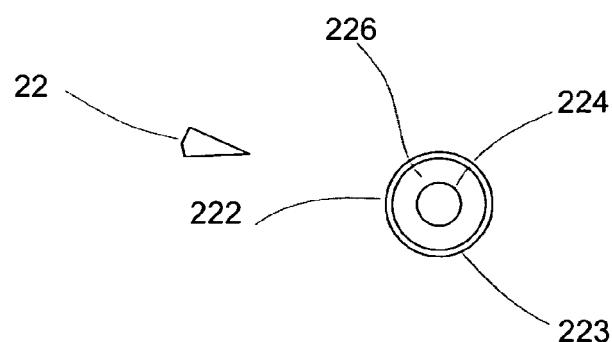

FIG. 10 illustrates a bottom view of Plunging Bolt 22, displaying a Primary Bolt Shaft Section 222, Secondary Bolt Shaft Section 223, Threaded Bolt Shaft Section 224. and Circumferential Shoulder 226.

Figure 11:
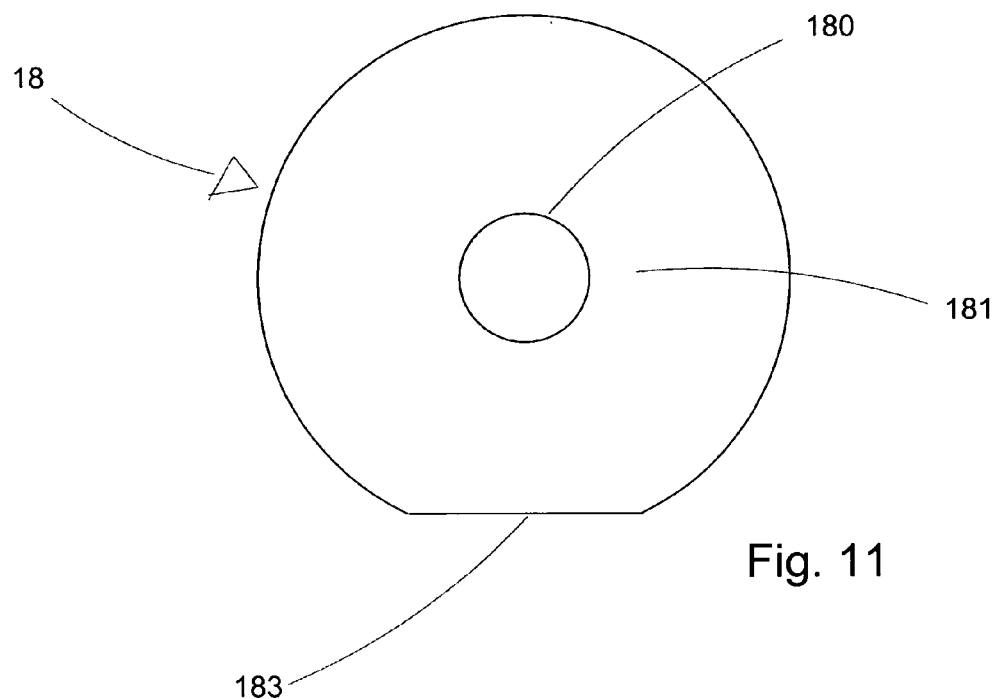

FIG. 11 illustrates a top view of Foot 18. Foot 18 is a truncated disk featuring a Threaded Bore 180, a Foot Upper Face 181, and a Foot Truncated Face 183.

Figure 12:
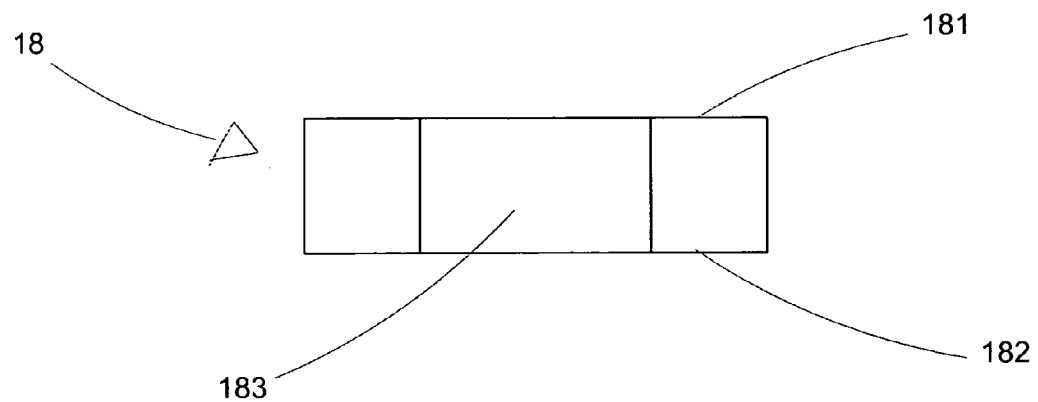

FIG. 12 illustrates a side view of Foot 18. This depiction demonstrates Foot Upper Face 181 and Foot Lower Face 182 are two planar surfaces, parallel to each other, and Foot Truncated Face 183 is a planar surface normal to both Upper Face 181 and Lower Face 182.

Figure 13:
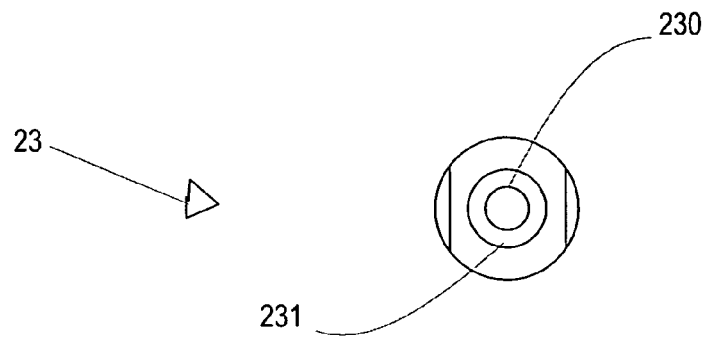

FIG. 13 illustrates a top view of Shroud 23, having a Shroud Bore 230 and a Threaded Shroud Collar 231.

Figure 14:
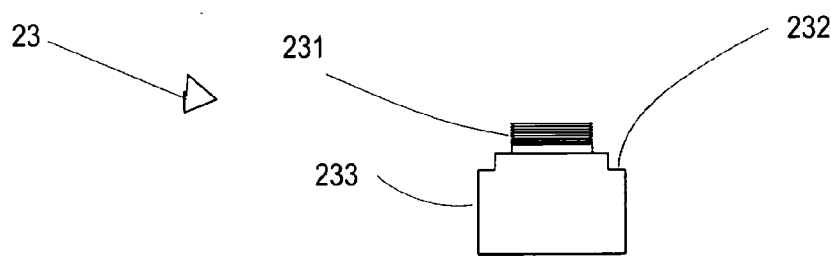

FIG. 14 illustrates an elevation view of Shroud 23. Here can be seen Threaded Shroud Collar 231, Shroud Adjustment Shoulder 232, and Shroud Outer Surface 233. Shroud Adjustment Shoulder 232 comprises two parallel shoulders, formed on the upper portion of Shroud 23, flanking Threaded Shroud Collar 231. The shoulders on Shroud 23 are wrench flats used to receive a crescent wrench to rotate Shroud 23. The shoulders are used for turning Shroud 23 in order to thread Shroud 23 onto Base 26. The shoulders are also used to adjust the pre-load on the Disk Springs 25. Both of these tasks are accomplished by rotating Shroud 23 with a wrench.

During the assembly process of threading Shroud 23 onto Base 26, Base 26 is held in place with pins that protrude from an assembly jig. These pins engage the Base Fixture Holes and prevent Base 26 from rotating while Shroud 23 is threaded onto Base 26 with a wrench using the shoulders on Shroud 23.

Figure 15:
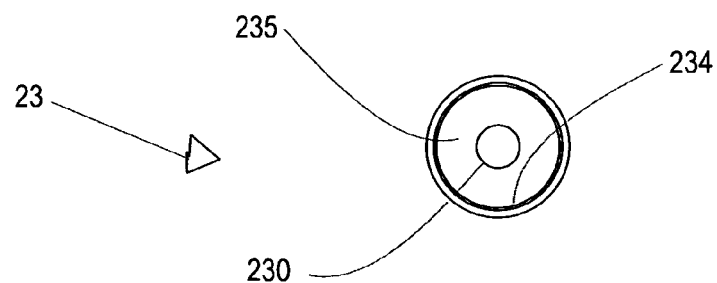

FIG. 15 illustrates a bottom view of Shroud 23, showing Shroud Bore 230, Shroud Base Well 235, and Shroud Base Well Threaded Surface 234.

Figure 16:
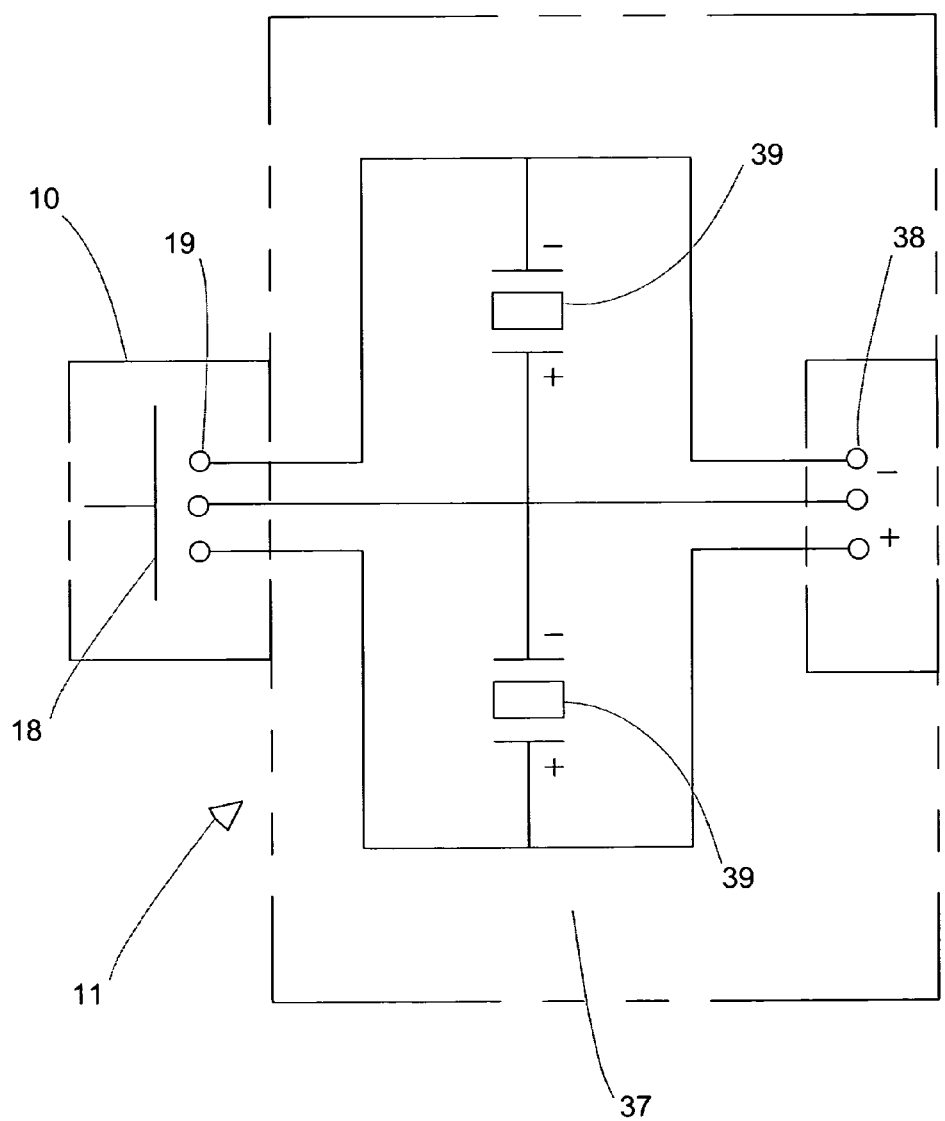

FIG. 16 depicts an electrical circuit schematic 11, demonstrating the electrical connectivity between Shunt Switch 10 and a Conventional Hydrophone 37, and further illustrating how impelling actuation of Foot 18 provides a short circuiting of the hydrophone signal circuitry.

DESCRIPTION OF THE PREFERRED EMBODIMENT

Ordinarily, hydrophones are designed to function over the widest possible range of operating conditions, including a wide range of operating depth. However, there are some special circumstances where it is imperative to limit the operating depth of a hydrophone to no more than a predetermined set limit. The distinguishing embodiment of the present invention addresses one of these special instances.

The present invention solves a particular problem, namely, preventing the operation of a hydrophone below a certain predetermined ocean depth. As hydrostatic pressure is a function of depth, consequently, it is possible to utilize hydrostatic pressure as a means for controlling the operability of the hydrophone. The present invention involves use of a freely-moving Protected Plunging Bolt 22, one end responsive to the hydrostatic pressure of the ocean environment, and the opposite end attached to an electrically conductive shunt which effectively short-circuits the hydrophone circuitry at or exceeding a predetermined hydrostatic pressure, thereby, preventing operation. If the hydrophone is raised to a depth more shallow than the predetermined ocean depth, the Plunging Bolt 22, responding to the lessened hydrostatic pressure, retracts the shunt, permitting the hydrophone to once again operate in a normal manner.

The present invention, Switch 10, is intended to function in cooperative conjunction with a commercially available hydrophone 37 (not claimed in the present invention).

Figure 1:
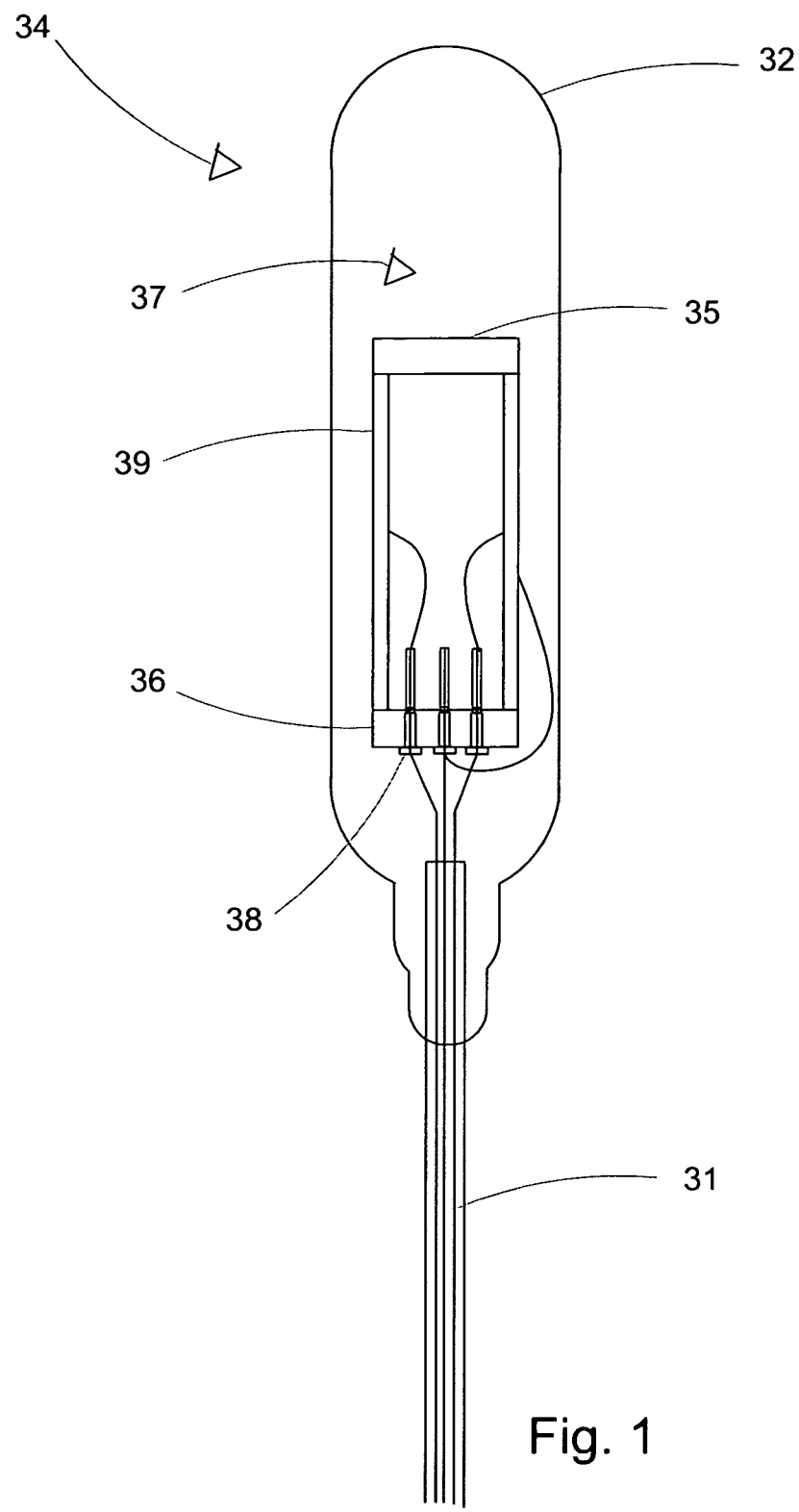
FIG. 1 is an elevation half-section view, illustrating a typical commercially available Encapsulated Hydrophone Assembly 34 (not claimed in the present invention), of a generally cylindrical body, the enclosed hydrophone 37 lacking connective conjunction with the present invention, namely, an acoustic hydrophone electrical signal limiting shunt switch. In this illustration, the hydrophone 37 comprises a ceramic element 39, having a Glass-ceramic upper end piece 35 and a Glass-ceramic lower end piece 36. Typically, the hydrophone 37 is electrically connected to a hydrophone signal conducting cable 31 by a plurality of hydrophone circuit pins 38, embedded in the lower end piece 36, generally, three pins, namely high hydrophone signal potential, low hydrophone signal potential, and ground. Typically, this conventional hydrophone configuration is protected from the ocean environment by Hydrophone Polyurethane Encapsulation 32.

As illustrated in FIG. 1, a conventional hydrophone typically comprises ceramic element assembly 39, supported on its upper end by a Glass-ceramic (commercially available material) upper end piece 35, and supported on its lower end by a similar Glass-ceramic lower end piece 36, the lower end piece 36 pierced by a plurality of electrically conducting pins 38. The electrically conducting pins 38, typically high potential, low potential, and ground, connect the hydrophone signal to a conducting transmission cable 31. A portion of the conducting cable 31 and the entire hydrophone 37 are protected from the intended operating environment by a polyurethane encapsulation 32, effectively shielding the hydrophone and its conducting circuitry from any moisture leakage or inundation.

In the configuration of FIG. 1, a conventional encapsulated hydrophone 34 will function at any depth within its design parameters; however, there are certain circumstances wherein the hydrophone should not be operational at any depth beyond a proscribed limit. This is the purpose of the present invention.

Figure 2:
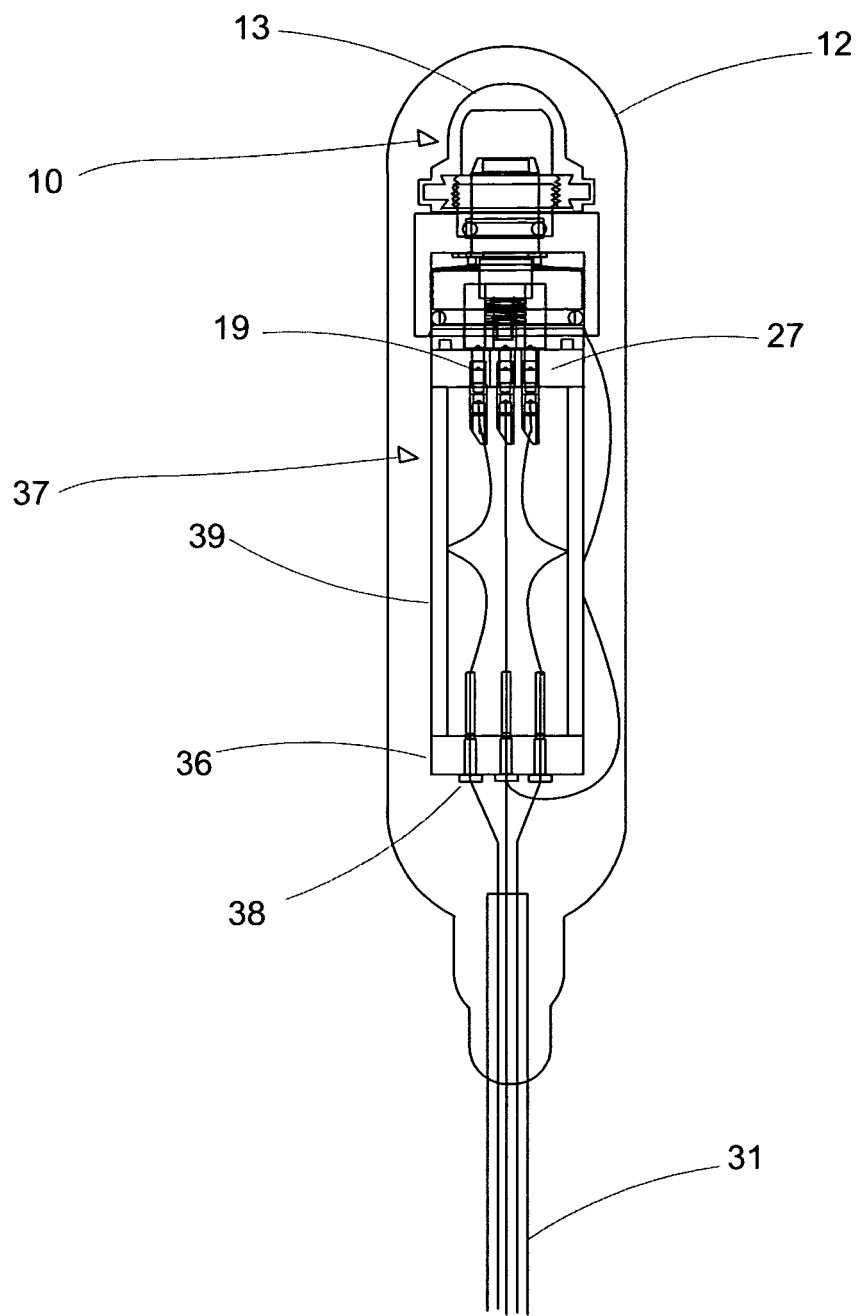
FIG. 2 is an elevation half-section view illustrating an encapsulated hydrophone assembly 12, of a generally cylindrical body comprising a modified associated hydrophone connectively conjoined with an embodiment of the present invention, namely, an acoustic hydrophone electrical signal limiting shunt switch 10, Switch 10 capped by Silicone Rubber Boot 13. Although protective, the primary purpose of the Silicone Rubber Boot 13 is to create and bound the oil-filled cavity which transduces the external ocean pressure into a measurable force impelled onto the plunging bolt. In this instance, the plurality of hydrophone circuit pins 38 is, observing signal polarity, connectively matched to an equivalent plurality of Electrically Conducting Spring-Loaded Pins 19, the Electrically Conducting Spring-Loaded Pins suitably positioned in Glass-ceramic shunt switch end piece 27, thereby interposing the depth limiting shunt switch 10 on the hydrophone circuitry.

When incorporated within the polyurethane switch and hydrophone encapsulation 12, as illustrated in FIG. 2, (and schematically in FIG. 16) the hydrophone hydrostatic shunt switch 10, interposed upon the circuitry of hydrophone 37, by means of a hydrostatic pressure actuated shunt, effectively denies operation of hydrophone 37 below a proscribed operational depth limit.

As illustrated in FIG. 2, the preferred embodiment of the present invention distinguishingly modifies the conventional hydrophone 37 by replacing Glass-ceramic Upper End Piece 35 with Glass-ceramic Switch End Piece 27. This new configuration, Schematic 11, depicted in FIG. 16, demonstrates how each of a plurality of pins 38, associated with Hydrophone 37, is singularly electrically conjoined with an associated pin from an equivalent plurality of Electrically Conducting Spring-Loaded Pins 19.

In this configuration, Hydrophone 37 will operate normally at depths shallower than a proscribed limit. If Hydrophone 37 descends to or below a proscribed depth, the increased hydrostatic pressure will actuate Shunt Switch 10, impelling Foot 18 (shown in FIG. 3), comprising an electrically conducting material, upon each and every pin, of the plurality of Electrically Conducting Spring-Loaded Pins 19, effectively imposing a short circuit across all pins of the plurality of hydrophone pins 38, and consequently, forming a short circuit across all signals present on Transmission Cable 31.

The pin configuration is not important in the functional sense of Shunt Switch 10. Practically, due to the cylindrical nature of the shunt switch, the pins are arranged symmetrically around the center point. Any number of pins can be used for different variations of the switch, (space permitting), and each number of pins could have a different arrangement. The preferred embodiment of the present invention utilizes three pins arranged around the center of the switch, offset 120° from each other for a three terminal device.

Figure 3:
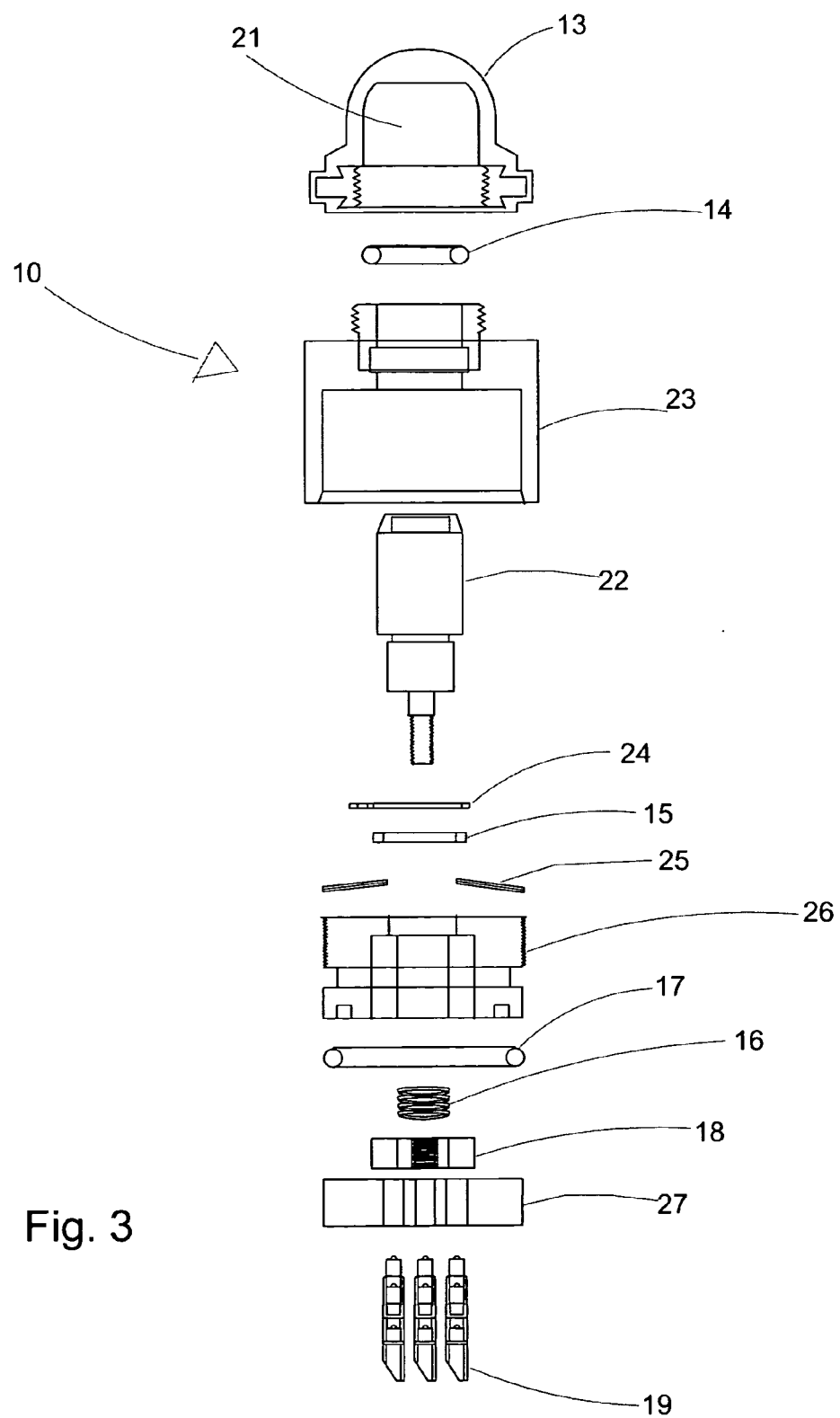
FIG. 3 is an exploded elevation half-section view illustrating each component of a preferred embodiment of the present invention, an acoustic hydrophone electrical Signal Limiting Shunt Switch 10. Electrical communication between a suitably modified associated conventional hydrophone and Shunt Switch 10 is facilitated by means of the plurality of conjoining Electrically Conducting Spring-Loaded Pins 19, located in Glass-ceramic Shunt Switch End Piece 27.

FIG. 3 is a half-section, exploded view depicting the various components comprising the preferred embodiment of the present invention; FIG. 4 is a half-section view illustrating the various components when assembled. There are three important aspects distinguishing the components which affect the operation of the preferred embodiment; first, communicating the ambient hydrostatic pressure that actuates Foot 18, via impelling Protected Plunging Bolt 22, second, adjusting the preferred embodiment of the present invention to actuate the Shunt Switch 10 at a predetermined pressure setting, and third, protecting the Shunt Switch 10 from the external environment of the ocean.

Upon Shunt Switch 10 actuation, impelled Foot 18 enables and establishes a short circuit across all hydrophone signal circuitry (See FIG. 16, Schematic of Shunt Switch and Hydrophone Circuitry). Foot 18, depicted in FIG. 11 (top view) and FIG. 12 (side view), is fabricated from an electrically conducting material, and is in the form of a truncated disk, having Threaded Bore 180, a Foot Upper Face 181, a Foot Lower Face 182, and a Foot Truncated Face 183. The Foot Upper Face 181 and Foot Lower Face 182 are each planar and parallel to each other; the Foot Truncated Face 183 is also planar and normal to both Upper Face 181 and Lower Face 182. The diameter of Foot 18 is sufficient to encompass all of the plurality of Electrically Conducting Spring-Loaded Pins 19 positioned in Glass-ceramic Switch End Piece 27.

Foot 18 is keyed and fits the keyed Base Foot Well 266 (Shown in FIG. 7) in Base 26. A "D" key is used (not shown). The Foot 18 is essentially a disk with a truncated flattened side and the keyway in the Base 26 is a corresponding "D" shaped cavity. There is no separate key that binds the Foot 18 and the Base 26. The geometry of the Foot 18 and the "D" shaped cavity of Base Foot Well 266 in the Base 26 prevents the Foot 18 from rotating.

In the center of the disc-like Foot 18, is a Threaded Bore 180 (Shown in FIG. 11), for threaded communication with Threaded Bolt Shaft Section 224 of impelling Plunging Bolt 22.

As depicted in FIGS. 5 (top view), 6 (side view), and 7 (bottom view), Base 26 comprises Base Bore 260, Base Upper Surface 261, Base Threaded Collar 262, Base O-Ring Groove 263, Base Lower Collar 264, Base Lower Collar Face 265, Base Foot Well 266, Base Fixture Holes 267.

The small Base Fixture Holes 267 depicted on the bottom surface of Base 26 are used for assembly purposes only (not claimed in the present invention). They are shallow free-fit dowel pin holes that are used in conjunction with an assembly jig to prevent Base 26 from rotating as Shroud 23 is screwed onto Base 26. The assembly jig has two dowel pins that project about a flat surface. The Base 26 is placed over the dowel pins such that the two holes on the bottom of the base engage the protruding dowel pins on the jig. This mechanically prevents Base 26 from rotating during assembly. After Shroud 23 is conjoined to Base 26 these holes are no longer utilized and are sealed with epoxy in the contiguous surface between Glass-ceramic Switch End Piece 27 and Base 26 during later assembly steps.

There is a keyway machined into Base 26 that receives Foot 18 preventing Foot 18 from rotating relative to the rotation of Plunging Bolt 22.

As illustrated in FIGS. 13 (top view), 14 (side view), and 15 (bottom view), Shroud 23 features Shroud Bore 230, Threaded Shroud Collar 231, Shroud Adjustment Shoulder 232, Shroud Outer Surface 233, Shroud Base Well Threaded Surface 234, and Shroud Base Well 235. Shroud Adjustment Shoulder 232, (not claimed in the present invention), one each, flanking Threaded Shroud Collar 231 is used in conjunction with a jig, for assembly purposes. Shroud Outer Surface 233 is approximately the same diameter as the outer diameter of Silicone Rubber Boot 13, and of sufficient diameter to permit Shroud Base Well 235 to adequately receive Base 26.

Upon assembly, Foot 18 fits within Base Foot Well 266 (Shown in FIG. 7) of Base 26; in turn, Base 26 fits within Shroud Base Well 235 (Shown in FIG. 15), conjoined by threads of Base Threaded Collar 262 and threads of Shroud Base Well Threaded Surface 234. This fabrication includes freely-moving Protected Plunging Bolt 22; threadingly conjoined by Threaded Bolt Shaft Section 224 and Threaded Bore 180 to Foot 18; Secondary Bolt Shaft Section 223 movably contained within Base Bore 260 of Base 26; Primary Bolt Shaft Section 222 movably contained within Shroud Bore 230 of Shroud 23.

Actuation of Shunt Switch 10 depends upon uninterrupted impelling motion of Plunging Bolt 22, conforming to restraints established by a hydrostatically sensitive spring mechanism. Motion of Plunging Bolt 22 is maintained by containing the movement of Secondary Bolt Shaft Section 223 (Shown in FIG. 9) of Plunging Bolt 22 within Base Bore 260 of Base 26 and Primary Bolt Shaft Section 222 within Shroud Bore 230 of Shroud 23.

As illustrated in FIGS. 8 (top view), 9 (side view), and 10 (bottom view), Plunging Bolt 22 comprises Bolt Head 220, featuring Bolt Adjustment Tool Aperture 221, Primary Bolt Shaft Section 222, Secondary Bolt Shaft Section 223, Threaded Bolt Shaft Section 224, and Bolt Snap-Ring Groove 225. Plunging Bolt 22 is free to move longitudinally through Shroud Bore 230 of Shroud 23 and Base Bore 260 of Base 26.

At a proscribed depth, Bolt Head 220, responding to external hydrostatic pressure, motivates Plunging Bolt 22 against a hydrostatically sensitive spring mechanism. If the adjustment of the hydrostatically sensitive spring mechanism is equal or less than the equivalent environmental hydrostatic pressure, Plunging Bolt 22, in communication with Foot 18, via Threaded Bolt Shaft Section 224 in conjunction with Threaded Bore 180 of Foot 18, impels Foot 18 upon Electrically Conducting Spring-Loaded Pins 19, shorting the hydrophone circuitry. Conversely, if the adjustment of the hydrostatically sensitive spring mechanism is greater than the equivalent environmental hydrostatic pressure, Plunging Bolt 22 remains stationary and the hydrophone is able to perform normally.

Shown in FIG. 8, in the preferred embodiment of the present invention, Bolt Adjustment Tool Aperture 221 in the head portion of freely-moving Plunging Bolt 22 is a screwdriver slot. Prior to installation of Silicone Rubber Boot 13, and subsequent Polyurethane Switch and Hydrophone Encapsulation 12, this slot enables Plunging Bolt 22 to be rotated easily with a screwdriver and the relative position of Foot 18 can be adjusted. This tool aperture is important as it is associated with the means for setting Shunt Switch 10 to actuate at a predetermined hydrostatic pressure. The actual shape of the Tool Aperture providing means for adjusting Shunt Switch 10 is not critical; it could be a hex head, Phillips head, socket head, etc.

In operation, Primary Bolt Shaft Section 222 rests within Shroud Bore 230 and Secondary Bolt Shaft Section 223 rests partially within Base Bore 260 of Base 26. Disk Springs 25 is disposed atop Base Upper Surface 261 of Base 26, the outer circumference of Disk Springs 25 stationed upon Base Upper Surface 261, forming a circumferential locus of Base Bore 260; conversely, the inner circumference of Disk Springs 25, somewhat elevated from the outer circumference, forms a circumferential locus of Secondary Bolt Shaft Section 223 of Plunging Bolt 22. Under compression, Disk Springs 25 pushes upwards against Shim Washer 15, which in turn, pushes upwards against Retaining Ring 24. Retaining Ring 24 (Shown in FIG. 3) is secured to Plunging Bolt 22, by means of engagement of Retaining Ring 24 in Bolt Snap-Ring Groove 225.

Disk Springs 25 may comprise one or more individual disc springs to achieve its intended purpose; it alone senses and responds to the force applied by Protected Plunging Bolt 22 and snaps to its full fully deflected position when a predetermined force is exceeded. Plunging Bolt 22, Foot 18, and Compression Spring 16 all move with Disk Springs 25 as it deflects. Disk Springs 25 (singular or plural) is matched in such a way to have a nonlinear force response causing the switching action at a predetermined applied force.

Compression Spring 16 does not act in opposition to the Disc Springs 25; it is placed under Secondary Bolt Shaft Section 223, and around Threaded Bolt Shaft Section 224. Subsequently, Foot 18 is then threaded onto Threaded Bolt Shaft Section 224. Compression Spring 16 exerts force between Circumferential Shoulder 226, the shoulder under Secondary Bolt Shaft Section 223, and Foot Upper Face 181 of Foot 18. The purpose of Compression Spring 16 is to exert a force on to Foot 18 so that Foot 18 resists unintended movement while threaded onto Plunging Bolt 22. Thus, Compression Spring 16 is isolated from the forces exerted on and by the Disc Springs 25.

Shunt Switch 10 is responsive to the external hydrostatic pressure, communicated from the external environment to Bolt Head 220 of Plunging Bolt 22 by means of Oil Filled Cavity 21 within Silicone Rubber Boot 13 (Shown in FIG. 2), Boot 13 suitably threaded and conjoined with Threaded Shroud Collar 231 of Shroud 23.

O-Ring A 14, seated in a female O-Ring gland located within Shroud Bore 230, seals the Oil Filled Cavity 21 from leaking through the seam between Shroud Bore 230 and Primary Bolt Shaft Section 222. O-Ring A 14 is part of the boundary of the sealed Oil Filled Cavity 21. Oil Filled Cavity 21 is bounded by Silicone Rubber Boot 13, O-Ring A 14, Shroud 23, and freely-moving Plunging Bolt 22.

O-Ring B 17, positioned in Base O-Ring Groove 263 (Shown in FIG. 6) of Base 26, seals the seam between Base 26 and Shroud 23, preventing liquid polyurethane intrusion into Hydrophone Hydrostatic Switch 10 during the encapsulation process. Polyurethane encapsulation, once cured, provides the watertight integrity of the entire Polyurethane Switch and Hydrophone Encapsulation 12.

Although only a few exemplary embodiments of the invention have been described in detail above, those skilled in the art will readily appreciate that many modifications are possible in the exemplary embodiment without materially departing from the novel teachings and advantages of this invention. Accordingly, all such modifications are intended to be included within the scope of this invention as defined in the following claims. In the claims, means-plus-functions clauses are intended to cover the structures described herein as performing the recited functions and not only structural equivalence but also equivalent structures.

What is claimed is:

1. A hydrophone signal limiting shunt switch, electrically associated and physically conjoined with a conventional hydrophone, for limiting hydrophone signal operability to water depths less than a predetermined, proscribed depth, said shunt switch comprising, a protected plunging bolt, said bolt having a bolt head, a bolt adjustment tool aperture, a primary bolt shaft section, a secondary bolt shaft section, a threaded bolt shaft section, a bolt snap-ring groove, a circumferential shoulder, said protected plunging bolt, rotatable around and movable along its primary axis, in its entirety, responsively communicating maritime hydrostatic pressure from said bolt head, via said primary bolt shaft section and said secondary bolt shaft section, to said threaded bolt shaft section;

an electrically conducting foot, said foot having a threaded bore, a foot upper face, a foot lower face, a foot truncated face, said threaded bore of said foot engaged by threads with said threaded bolt shaft section of said protected plunging bolt, said electrically conducting foot movable in consonance with movement of said protected plunging bolt;

a base, said base having a base bore, a base upper surface, a base threaded collar, a base o-ring groove, a base lower collar, a base lower collar face, a base foot well, said base foot well, incorporating a key to form a truncated cylinder, providing appropriate containment housing for said foot, said foot also in the form of a truncated cylinder, and preventing said foot from rotating when said protected plunging bolt is rotated to adjust proscribed depth actuation of said shunt switch, said base bore accommodating and protecting said secondary bolt shaft section of said protected plunging bolt;

a shroud, said shroud having a shroud bore, a shroud bore o-ring groove, a threaded shroud collar, a shroud fixture shoulder, a shroud outer surface, a shroud base well threaded surface, a shroud base well, said shroud base well threaded section engaged with said base threaded collar by threads, said shroud base well, encompassing said base, said shroud bore accommodating and protecting said primary bolt shaft section of said protected plunging bolt, said shroud includes said shroud bore o-ring groove for seating o-ring A, sealing the seam between said plunging bolt and said shroud bore, the seam bounding the oil filled cavity, preventing oil leakage into the switch body;

pressure communicating means for communicating external ocean hydrostatic pressure to said bolt head;

proscribed depth adjustment means for adjusting said shunt switch to respond at a predetermined, proscribed water depth;

environmental protection means for protecting said shunt switch from undesired shunt switch oil leakage and direct contact with the ocean environment;

switch activation means for activating said shunt switch, shunting, and consequently quenching the hydrophone electric signal from an associated conjoined hydrophone when the hydrophone is lowered to a proscribed water depth;

a plurality of electrically conducting, spring-loaded pins, said pins operatively inserted in and firmly affixed to a glass-ceramic shunt switch end piece of said shunt switch, said pins providing electrical signal conductivity between said shunt switch and the associated, conjoined conventional hydrophone, the number of said spring-loaded pins matching and in consonance with the number of pins utilized in electrically connecting the conjoined hydrophone to a conventional submarine transmission cable;

said shunt switch, readily adjustable to a predetermined, proscribed depth setting during fabrication, however, tamperproof following fabrication, configured for a simple modification and conjoining with a conventional, commercially available hydrophone, for limiting the operability of that hydrophone to depths above a predetermined, proscribed water depth.

2. A hydrophone signal limiting shunt switch, electrically associated and physically conjoined with a conventional hydrophone, as recited in claim 1, wherein said pressure communicating means is effected by an oil-filled cavity, the oil in direct contact with said bolt head of said bolt, said plunging bolt head transducing the pressure within the oil filled cavity, through its cross section area, into a linear force communicating through said primary bolt shaft section to said retaining ring and said shim washer to at least one disk spring positioned on said base upper surface, linear movement of said plunging bolt resisted by said at least one disk spring, said plunging bolt having negligible movement in response to an applied pressure, then moving nonlinearly when the correlating preload force of said at least one disk spring is exceeded, the oil contained within a pliable waterproof silicone rubber boot, the outer surface of the boot responsive to the hydrostatic pressure of the environment, the oil communicating the external hydrostatic pressure to said bolt head.

3. A hydrophone signal limiting shunt switch, electrically associated and physically conjoined with a conventional hydrophone, as recited in claim 2, wherein said proscribed depth adjustment means is effected, during fabrication, by insertion of an adjustment tool in said bolt adjustment tool aperture, turning said threaded bolt shaft section in said threaded bore of said foot effecting controlled flexing of said at least one disk spring, said at least one disk spring positioned on said base upper surface, circumscribing said base bore and said secondary bolt shaft section of said protected plunging bolt, said shroud being threaded onto said base and being rotated to adjust the preload force of said at least one disk spring, said at least one disk spring maintained into position and responsive to force from rotation of said shroud, the force from rotation of said shroud communicated to said at least one disk spring from a shim washer interposed between said at least one disk spring, and a retaining ring positioned in said bolt snap-ring groove of said for connected plunging bolt, said threaded bolt shaft section, further, having a compression spring positioned circumferentially around said threaded bolt shaft and interposed between said foot upper face and said circumferential shoulder of said protected plunging bolt, the compression spring exerting a force on to said foot preventing unintended movement of said foot while said protected plunging bolt is rotated, rotating said plunging bolt adjusting the relative position of said electrically conducting foot along said plunging bolt threaded shaft section, actuation depth being set by the physical properties of said at least one disk spring, said at least one disk spring having a nonlinear force response and collapses to a flat position when the force, defined by the geometry of said at least one disk spring itself, is exceeded, rotating said plunging bolt allowing for said foot to be precisely located along said plunging bolt threaded shaft section such that said foot contacts said spring loaded pins as said at least one disk spring collapses, actuation depth determined by measuring the force/deflection characteristics of said at least one disk spring in selecting and/or matching said at least one disk spring such that said at least one disk spring collapses to a flat position when a particular desired applied force, correlating to the desired actuation pressure transduces to a linear force through the cross-section area of said plunging bolt primary shaft section, is exceeded, said plunging bolt then rotated to position said foot such that said foot makes contact with said spring-loaded pins as said at least one disk spring collapses due to the applied force of said plunging bolt acting through said retaining ring and said shim washer said spring-loaded pins directly connected to the hydrophone ceramic element, consequently, shunting said spring-loaded pins of said switch also shorting the hydrophone ceramic element itself, preventing any signal from forming, said o-ring A seated within said o-ring groove located within said shroud bore, effectively sealing the seam between said plunging bolt and said shroud bore, consequently, containing said oil filled cavity within the bounds of said silicone rubber boot and said shroud bore o-ring, preventing any oil presence in said switch below said shroud bore o-ring, a second set of at least one o-ring positioned in said base o-ring groove of said base, so positioned to prevent polyurethane from entering said switch during the encapsulation process.

4. A hydrophone signal limiting shunt switch, electrically associated and physically conjoined with a conventional hydrophone, as recited in claim 3, wherein said switch activation means is effected by said protected plunging bolt, responding to hydrostatic pressure on said bolt head, said plunging bolt having negligible movement in response to an applied pressure, then moving nonlinearly when the correlating preload force of said at least one disk spring is exceeded, communicating flexing force to said at least one disk spring, forcing said electrically conducting foot in direct electrical contact on plurality of said electrically conducting spring-loaded pins, creating a short-circuit shunt across all of said spring-loaded pins, further creating a shunt across all circuit pins of the associated, conjoined hydrophone, effectively quenching the operability the hydrophone, said spring-loaded pins directly connected to the hydrophone ceramic element, consequently, shunting said spring-loaded pins of said switch also shorts the hydrophone ceramic element itself, preventing any signal from forming.

5. A hydrophone signal limiting shunt switch, electrically associated and physically conjoined with a conventional hydrophone, as recited in claim 4, wherein said environmental protection means is at least one shroud bore o-ring positioned within a female o-ring groove located within said shroud bore, effectively sealing the seam between said plunging bolt and said shroud bore, consequently, containing said oil filled cavity within the bounds of said silicone rubber boot and said shroud bore o-ring, preventing any oil presence in said switch below said shroud bore o-ring, a second set of at least one o-ring positioned in said base o-ring groove of said base, so positioned to prevent polyurethane from entering said switch during the encapsulation process.

6. A hydrophone signal limiting shunt switch, electrically associated and physically conjoined with a conventional hydrophone, as recited in claim 5, wherein said protected plunging bolt, said foot, said shroud, said base are formed from durable material selected from a group consisting of stainless steel, carbon steel, titanium, polycarbonate composition, and aluminum alloy.

7. A hydrophone signal limiting shunt switch, electrically associated and physically conjoined with a conventional hydrophone, as recited in claim 6, wherein said bolt adjustment tool aperture is selected from a group consisting of screwdriver slot, Phillips head, and hex key.

8. A hydrophone signal limiting shunt switch, electrically associated and physically conjoined with a conventional hydrophone, for limiting hydrophone signal operability to water depths less than a predetermined, proscribed depth, said shunt switch comprising, a protected plunging bolt, said bolt having a bolt head, a bolt adjustment tool aperture, a primary bolt shaft section, a secondary bolt shaft section, a threaded bolt shaft section, a bolt snap-ring groove, a circumferential shoulder, said protected plunging bolt, rotatable around and movable along its primary axis, in its entirety, responsively communicating maritime hydrostatic pressure from said bolt head, via said primary bolt shaft section and said secondary bolt shaft section, to said threaded bolt shaft section;

an electrically conducting foot, said foot having a threaded bore, a foot upper face, a foot lower face, a foot truncated face, said threaded bore of said foot engaged by threads with said threaded bolt shaft section of said protected plunging bolt, said electrically conducting foot movable in consonance with movement of said protected plunging bolt;

a base, said base having a base bore, a base upper surface, a base threaded collar, a base o-ring groove, a base lower collar, a base lower collar face, a base foot well, said base foot well, incorporating a key to form a truncated cylinder, providing appropriate containment housing for said foot, said foot also in the form of a truncated cylinder, and preventing said foot from rotating when said protected plunging bolt is rotated to adjust proscribed depth actuation of said shunt switch, said base bore accommodating and protecting said secondary bolt shaft section of said protected plunging bolt;

a shroud, said shroud having a shroud bore, a shroud bore o-ring groove, a threaded shroud collar, a shroud fixture shoulder, a shroud outer surface, a shroud base well threaded surface, a shroud base well, said shroud base well threaded section engaged with said base threaded collar by threads, said shroud base well, encompassing said base, said shroud bore accommodating and protecting said primary bolt shaft section of said protected plunging bolt;

at least one disk spring, said at least one disk spring positioned on said base upper surface of said base, circumscribing said base bore and said secondary bolt shaft section of said protected plunging bolt, flexure of said disk spring by force exerted from said protected plunging bolt the sole determinant of actuation pressure of said shunt switch;

pressure communicating means for communicating external ocean hydrostatic pressure to said bolt head;

environmental protection means for protecting said shunt switch from undesired shunt switch oil leakage and direct contact with the ocean environment;

a plurality of electrically conducting, spring-loaded pins, said pins operatively inserted in and firmly affixed to a glass-ceramic shunt switch end piece of said shunt switch, said pins providing electrical signal conductivity between said shunt switch and the associated, conjoined conventional hydrophone, the number of said spring-loaded pins matching and in consonance with the number of pins utilized in electrically connecting the conjoined hydrophone to a conventional submarine transmission cable;

actuation depth determined by measuring the force/deflection characteristics of said at least one disk spring in selecting and/or matching said at least one disk spring such that said at least one disk spring collapses to a flat position when a particular desired applied force, correlating to the desired actuation pressure transduces to a linear force through the cross-section area of said plunging bolt primary shaft section, is exceeded, said plunging bolt then rotated to position said foot such that said foot makes contact with said spring-loaded pins as said at least one disk spring collapses due to the applied force of said plunging bolt acting through said retaining ring and said shim washer, proscribed depth adjustment effected, during fabrication, by insertion of an adjustment tool in said bolt adjustment tool aperture, turning said threaded bolt shaft section in said threaded bore of said foot effecting controlled flexing of said at least one disk spring, said at least one disk spring positioned on said base upper surface, circumscribing said base bore and said secondary bolt shaft section of said protected plunging bolt, said at least one disk spring maintained into position and responsive to force from rotation of said shroud, the force from rotation of said shroud communicated to said at least one disk spring from a shim washer interposed between said at least one disk spring, and a retaining ring positioned in said bolt snap-ring groove of said for connected plunging bolt, said shroud being threaded onto said base and being rotated to adjust the preload force of said at least one disk spring, rotating said plunging bolt adjusting the relative position of said electrically conducting foot along said plunging bolt threaded shaft section, actuation depth being set by the physical properties of said at least one disk spring, said at least one disk spring having a nonlinear force response and collapses to a flat position when the force, defined by the geometry of said disk spring itself, is exceeded, rotating said plunging bolt allowing for said foot to be precisely located along said plunging bolt threaded shaft section such that said foot contacts said spring loaded pins as said at least one disk spring collapses, said threaded bolt shaft section, further, having a compression spring positioned circumferentially around said threaded bolt shaft and interposed between said foot upper face and said circumferential shoulder of said protected plunging bolt, the compression spring exerting a force on to said foot preventing unintended movement of said foot while said protected plunging bolt is rotated, switch activation effected by said protected plunging bolt, responding to hydrostatic pressure on said bolt head, communicating flexing force to said at least one disk spring, forcing said electrically conducting foot in direct electrical contact on plurality of said electrically conducting spring-loaded pins, creating a short-circuit shunt across all of said spring-loaded pins, further creating a shunt across all circuit pins of the associated, conjoined hydrophone, effectively quenching the operability of the hydrophone, said spring-loaded pins directly connected to the hydrophone ceramic element, consequently, shunting said spring-loaded pins of said switch also shorting the hydrophone ceramic element itself, preventing any signal from forming; said shunt switch, readily adjustable to a predetermined, proscribed depth setting during fabrication, however, tamper-proof following fabrication, configured for a simple modification and conjoining with a conventional, commercially available hydrophone, for limiting the operability of that hydrophone to depths above a predetermined, proscribed water depth.

9. A hydrophone signal limiting shunt switch, electrically associated and physically conjoined with a conventional hydrophone, as recited in claim 8, wherein said pressure communicating means is effected by an oil-filled cavity, the oil in direct contact with said bolt head, the oil contained within a pliable water-proof silicone rubber boot, the outer surface of the boot responsive to the hydrostatic pressure of the environment, the oil communicating the external hydrostatic pressure to said bolt head of said bolt, said plunging bolt having negligible movement in response to an applied pressure, then moving nonlinearly when the correlating preload force of said at least one disk spring is exceeded, said plunging bolt head transducing the pressure within the oil filled cavity, through its cross section area, into a linear force communicating through said primary bolt shaft section to said retaining ring and said shim washer to said at least one disk spring positioned on said base upper surface, linear movement of said plunging bolt resisted by said at least one disk spring, the hydrostatic force communicated from said bolt to said foot for actuation of said switch.

10. A hydrophone signal limiting shunt switch, electrically associated and physically conjoined with a conventional hydrophone, as recited in claim 9, wherein said environmental protection means is accomplished by said shroud including said shroud bore o-ring groove for seating said o-ring A, sealing the seam between said plunging bolt and said shroud bore, the seam bounding the oil filled cavity, preventing oil leakage into the switch body, said o-ring A seated within said o-ring groove located within said shroud bore, effectively sealing the seam between said plunging bolt and said shroud bore, consequently, containing said oil filled cavity within the bounds of said silicone rubber boot and said shroud bore o-ring, preventing any oil presence in said switch below said shroud bore o-ring, a second set of at least one o-ring positioned in said base o-ring groove of said base, so positioned to prevent polyurethane from entering said switch during the encapsulation process.

11. A hydrophone signal limiting shunt switch, electrically associated and physically conjoined with a conventional hydrophone, as recited in claim 10, wherein said protected plunging bolt, said foot, said shroud, said base are formed from durable material selected from a group consisting of stainless steel, carbon steel, titanium, polycarbonate composition, and aluminum alloy.

12. A hydrophone signal limiting shunt switch, electrically associated and physically conjoined with a conventional hydrophone, as recited in claim 11, wherein said bolt adjustment tool aperture is selected from a group consisting of screwdriver slot, Phillips head, and hex key.

13. A hydrophone signal limiting shunt switch, electrically associated and physically conjoined with a conventional hydrophone, for limiting hydrophone signal operability to water depths less than a predetermined, proscribed depth, said shunt switch comprising,
   a protected plunging bolt, said bolt having a bolt head, a bolt adjustment tool aperture, a primary bolt shaft section, a secondary bolt shaft section, a threaded bolt shaft section, a bolt snap-ring groove, a circumferential shoulder, said protected plunging bolt, rotatable around and movable along its primary axis, in its entirety, responsively communicating maritime hydrostatic pressure from said bolt head, via said primary bolt shaft section and said secondary bolt shaft section, to said threaded bolt shaft section;
   an electrically conducting foot, said foot having a threaded bore, a foot upper face, a foot lower face, a foot truncated face, said threaded bore of said foot engaged by threads with said threaded bolt shaft section of said protected plunging bolt, said electrically conducting foot movable in consonance with movement of said protected plunging bolt;
   a base, said base having a base bore, a base upper surface, a base threaded collar, a base o-ring groove, a base lower collar, a base lower collar face, a base foot well, said base foot well, incorporating a key to form a truncated cylinder, providing appropriate containment housing for said foot, said foot also in the form of a truncated cylinder, and preventing said foot from rotating when said protected plunging bolt is rotated to adjust proscribed depth actuation of said shunt switch, said base bore accommodating and protecting said secondary bolt shaft section of said protected plunging bolt;
   a shroud, said shroud having a shroud bore, a shroud bore o-ring groove, a threaded shroud collar, a shroud fixture shoulder, a shroud outer surface, a shroud base well threaded surface, a shroud base well, said shroud base well threaded section engaged with said base threaded collar by threads, said shroud base well, encompassing said base, said shroud bore accommodating and protecting said primary bolt shaft section of said protected plunging bolt, said shroud being threaded onto said base and being rotated to adjust the preload force of said at least one disk spring, said shroud includes said shroud bore o-ring groove for seating o-ring A, sealing the seam between said plunging bolt and said shroud bore, the seam bounding the oil filled cavity, preventing oil leakage into the switch body;
   at least one disk spring, said disk spring positioned on said base upper surface of said base, circumscribing said base bore and said secondary bolt shaft section of said protected plunging bolt, flexure of said disk spring by force exerted from said protected plunging bolt the sole determinant of actuation pressure of said shunt switch;
   a plurality of electrically conducting, spring-loaded pins, said pins operatively inserted in and firmly affixed to a glass-ceramic shunt switch end piece of said shunt switch, said pins providing electrical signal conductivity between said shunt switch and the associated, conjoined conventional hydrophone, the number of said spring-loaded pins matching and in consonance with the number of pins utilized in electrically connecting the conjoined hydrophone to a conventional submarine transmission cable, said spring-loaded pins directly connected to the hydrophone ceramic element, consequently, shunting said spring-loaded pins of said switch also shorting the hydrophone ceramic element itself, preventing any signal from forming;

proscribed depth adjustment effected, during fabrication, by insertion of an adjustment tool in said bolt adjustment tool aperture, turning said threaded bolt shaft section in said threaded bore of said foot effecting controlled flexing of at least one disk spring, said at least one disk spring positioned on said base upper surface, circumscribing said base bore and said secondary bolt shaft section of said protected plunging bolt, said at least one disk spring maintained into position and responsive to force from rotation of said shroud, the force from rotation of said shroud communicated to said at least one disk spring from a shim washer interposed between said at least one disk spring, and a retaining ring positioned in said bolt snap-ring groove of said for connected plunging bolt, rotating said plunging bolt adjusting the relative position of said electrically conducting foot along said plunging bolt threaded shaft section, actuation depth being set by the physical properties of said at least one disk spring, said at least one disk spring having a nonlinear force response and collapses to a flat position when the force, defined by the geometry of said disk spring itself, is exceeded, rotating said plunging bolt allowing for said foot to be precisely located along said plunging bolt threaded shaft section such that said foot contacts said spring loaded pins as said at least one disk spring collapses, said threaded bolt shaft section, further, having a compression spring positioned circumferentially around said threaded bolt shaft and interposed between said foot upper face and said circumferential shoulder of said protected plunging bolt, the compression spring exerting a force on to said foot preventing unintended movement of said foot while said protected plunging bolt is rotated, actuation depth determined by measuring the force/deflection characteristics of said at least one disk spring in selecting and/or matching said at least one disk spring such that said at least one disk spring collapses to a flat position when a particular desired applied force, correlating to the desired actuation pressure transduces to a linear force through the cross-section area of said plunging bolt primary shaft section, is exceeded, said plunging bolt then rotated to position said foot such that said foot makes contact with said spring-loaded pins as said at least one disk spring collapses due to the applied force of said plunging bolt acting through said retaining ring and said shim washer;

switch activation effected by said protected plunging bolt, responding to hydrostatic pressure on said bolt head of said bolt, said plunging bolt having negligible movement in response to an applied pressure, then moving nonlinearly when the correlating preload force of said at least one disk spring is exceeded, said plunging bolt head transducing the pressure within the oil filled cavity, through its cross section area, into a linear force communicating through said primary bolt shaft section to said retaining ring and said shim washer to said at least one disk spring positioned on said base upper surface, linear movement of said plunging bolt resisted by said at least one disk spring, communicating flexing force to at least one said disk spring, forcing said electrically conducting foot in direct electrical contact on plurality of said electrically conducting spring-loaded pins, creating a short-circuit shunt across all of said spring-loaded pins, further creating a shunt across all circuit pins of the associated, conjoined hydrophone, effectively quenching the operability of the hydrophone;

pressure communicating from external hydrostatic pressure to said bolt head effected by an oil-filled cavity, the oil in direct contact with said bolt head, the oil contained within a pliable water-proof silicone rubber boot, the outer surface of the boot responsive to the hydrostatic pressure of the environment, the oil communicating the external hydrostatic pressure to said bolt head;

environmental protection effected by said o-ring A seated within said o-ring groove located within said shroud bore, effectively sealing the seam between said plunging bolt and said shroud bore, consequently, containing said oil filled cavity within the bounds of said silicone rubber boot and said shroud bore o-ring, preventing any oil presence in said switch below said shroud bore o-ring, a second set of at least one o-ring positioned in said base o-ring groove of said base, so positioned to prevent polyurethane from entering said switch during the encapsulation process;

said shunt switch, readily adjustable to a predetermined, proscribed depth setting during fabrication, however, tamper-proof following fabrication, configured for a simple modification and conjoining with a conventional, commercially available hydrophone, for limiting the operability of that hydrophone to depths above a predetermined, proscribed water depth.

14. A hydrophone signal limiting shunt switch, electrically associated and physically conjoined with a conventional hydrophone, as recited in claim 13, wherein said protected plunging bolt, said foot, said shroud, said base are formed from durable material selected from a group consisting of stainless steel, carbon steel, titanium, polycarbonate composition, and aluminum alloy.

15. A hydrophone signal limiting shunt switch, electrically associated and physically conjoined with a conventional hydrophone, as recited in claim 14, wherein said bolt adjustment tool aperture is selected from a group consisting of screwdriver slot, Phillips head, and hex key.

* * * * *